(12) United States Patent
Ogasawara et al.

(10) Patent No.: US 8,018,814 B2
(45) Date of Patent: Sep. 13, 2011

(54) ABERRATION CORRECTION DEVICE, ABERRATION CORRECTION METHOD AND OPTICAL PICKUP

(75) Inventors: Masakazu Ogasawara, Saitama (JP); Shinichi Fujinoki, Saitama (JP)

(73) Assignee: Pioneer Corporation, Tokyo (JP)

( * ) Notice: Subject to any disclaimer, the term of this patent is extended or adjusted under 35 U.S.C. 154(b) by 668 days.

(21) Appl. No.: 11/587,935

(22) PCT Filed: Apr. 14, 2005

(86) PCT No.: PCT/JP2005/007218
§ 371 (c)(1),
(2), (4) Date: Oct. 26, 2006

(87) PCT Pub. No.: WO2005/106865
PCT Pub. Date: Nov. 10, 2005

(65) Prior Publication Data
US 2008/0055713 A1    Mar. 6, 2008

(30) Foreign Application Priority Data
Apr. 28, 2004 (JP) .................................. 2004-133844

(51) Int. Cl.
*G11B 7/135* (2006.01)
*G11B 7/00* (2006.01)
(52) U.S. Cl. ................................ 369/112.02; 369/44.23
(58) Field of Classification Search .................. None
See application file for complete search history.

(56) References Cited

U.S. PATENT DOCUMENTS

| | | | |
|---|---|---|---|
| 6,151,154 A * | 11/2000 | Ogasawara et al. | 359/279 |
| 6,449,236 B2 * | 9/2002 | Wals et al. | 369/112.02 |
| 7,411,882 B2 * | 8/2008 | Katayama | 369/112.02 |
| 7,746,736 B2 * | 6/2010 | Yamasaki et al. | 369/44.41 |
| 2001/0028028 A1 * | 10/2001 | Iwasaki et al. | 250/216 |
| 2002/0181502 A1 * | 12/2002 | Yi | 370/467 |
| 2002/0191502 A1 * | 12/2002 | Hirai | 369/44.24 |
| 2003/0053393 A1 * | 3/2003 | Shimano et al. | 369/112.02 |

FOREIGN PATENT DOCUMENTS

| | | |
|---|---|---|
| JP | 10-289465 A | 10/1998 |
| JP | 2000-040249 A | 2/2000 |
| JP | 2000-067453 A | 3/2000 |
| JP | 2001-249315 A | 9/2001 |
| JP | 2003-173562 A | 6/2003 |
| JP | 2003-338070 A | 11/2003 |

\* cited by examiner

*Primary Examiner* — Hoa T Nguyen
*Assistant Examiner* — Emily Frank
(74) *Attorney, Agent, or Firm* — Arent Fox LLP (57) ABSTRACT

The present invention is to provide an improved aberration correction device formed by inserting an electro-optic panel such as a liquid crystal panel in an image-formation optical system to correct aberrations in the image-formation optical system, characterized in that such a correction device is capable of correcting three or more kinds of aberrations using only one electro-optic panel.

Divided areas concerning coma aberration correction and divided areas concerning astigmatism correction are formed in one of the transparent electrodes of the electro-optic panel, while the rest of divided areas concerning coma aberration correction and divided areas concerning spherical aberration correction are formed in the other of the transparent electrodes. In this way, it is possible to form divided areas divided into electrode patterns suitable for correcting various aberrations, simplify as much as possible the electrode structure of the transparent electrodes consisting of the divided areas, thereby simplifying a control of voltages to be applied to the divided areas.

4 Claims, 10 Drawing Sheets

OPTIMUM IMAGE POINT

F: 225mn~275nm
E: 175mn~225nm
D: 125mn~175nm
C: 75mn~125nm
B: 25mn~75nm
A: −25mn~25nm
G: −75mn~−25nm
H: −125mn~−75nm
I: −175mn~−125nm
J: −225mn~−175nm
K: −275mn~−225nm

WAVE SURFACE ABERRATION RMS VALUES

FIG.10 (a)
WHEN CORRECTING COME ABERRATION

FIG.10 (b)
WHEN CORRECTING SPHERICAL ABERRATION

FIG.10 (c)
WHEN CORRECTING ASTIGMATISM

ABERRATION CORRECTION DEVICE, ABERRATION CORRECTION METHOD AND OPTICAL PICKUP

CROSS-REFERENCE TO RELATED APPLICATION

This application is a National Stage entry of International Application No. PCT/JP2005/007218 filed Apr. 14, 2005, which claims benefit of Japan Application No. 2004-133844 filed Apr. 28, 2004, the entire specification claims and drawings of which are incorporated herewith by reference.

TECHNICAL FIELD

The present invention relates to an aberration correction device, an aberration correction method and an optical pickup.

BACKGROUND TECHNIQUE

Conventionally, to dynamically correct aberration in an image-formation optical system, there has been known an aberration correction device using a liquid crystal panel. Such an aberration correction device is fabricated in a manner such that transparent electrodes of its liquid crystal panel are formed by virtue of divided areas having aberration correction patterns, and aberration correction is performed by providing a phase difference corresponding to a divided area to a light beam passing through the liquid crystal panel, by virtue of an electro-optic effect of the liquid crystal panel.

Such an aberration correction device is used in an image-formation optical system of an optical pickup which converges a light beam emitted from a light source on to a recording surface of an optical information recording medium, while a reflection light from the recording surface is formed into an image on a detection surface of a detector. In such an image-formation optical system, a coma aberration occurred due to a tilt or the like of an optical information recording medium, a spherical aberration occurred due to a thickness error of an optical recording medium, an astigmatism occurred due to distortion of optical parts of the optical pickup will each bring about a significant unfavorable influence on a recording/reproducing performance. As a result, the foregoing three kinds of aberrations have become correction objects for an aberration correction device to deal with. In using the above-described aberration correction device having a liquid crystal panel, when an aberration correction is performed, it is required to find a wave surface aberration distribution of each aberration in a pupil surface of an objective lens, so as to form an electrode pattern consisting of divided areas in transparent electrode of the liquid crystal panel inserted in an image-formation optical system, in response to the wave surface aberration distribution.

For example, the following patent document 1 has disclosed an optical pickup having a laser light source, an objective lens, and an aberration correction means consisting of a liquid crystal panel provided on an optical axis of a laser beam. In such an optical pickup, one transparent electrode of the liquid crystal panel consisting of a pair of transparent electrodes is used as a first electrode divided into a pattern corresponding to a wave surface aberration distribution of a coma aberration in a pupil surface of an objective lens, while the other transparent electrode is used as a second electrode divided into a pattern having a converging function for correcting a spherical aberration.

Moreover, the patent document 1 has disclosed that one electrode of a pair of transparent electrodes in the liquid crystal panel forming an aberration correction means is divided into a pattern corresponding to a wave surface aberration distribution of a coma aberration in a pupil surface of the objective lens, as well as a pattern for correcting a spherical aberration.

The following patent document 2 has disclosed another aberration correction device using a similar liquid crystal panel, in which a light beam passing area of the liquid panel is divided into a plurality of portions corresponding to an astigmatism distribution, while voltages corresponding to the directions of the astigmatisms to be corrected are applied to the electrodes provided in the divided areas, and a phase difference for correcting an astigmatism is provided to a light beam passing through each divided area in response to a voltage change.

Patent document 1: Japanese Unexamined Patent Application Publication No. (Hei) 10-289465.
Patent document 2: Japanese Unexamined Patent Application Publication No. 2000-40249.

DISCLOSURE OF THE INVENTION

Problem(s) to be Solved by the Invention

When several kinds of aberrations need to be corrected as in the above-discussed image-formation optical system, if an aberration correction is performed using an electro-optic effect of the aforementioned liquid crystal panel, once divided areas of an electrode pattern for correcting different aberrations are formed in a pair of transparent electrodes of the liquid crystal panel, it is allowed to correct only two kinds of aberrations.

Moreover, as disclosed in patent document 1, when one transparent electrode in a liquid crystal panel consisting of a pair of transparent electrodes is divided to satisfy two kinds of aberration corrections, it would be impossible to form divided areas suitable for two kinds of aberration. For example, as discussed in patent document 1, a circular divided area having a converging function for correcting a spherical aberration is divided into three portions in a predicted tilt direction of an optical information recording medium as well as in a direction perpendicular to the predicted tilt direction, thereby forming on one transparent electrode side a divided area concerning coma aberration correction and another divided area concerning spherical aberration correction. In this way, if a circular divided area having a converging function is set at a size capable of correcting a spherical aberration, it would be impossible to form a divided area capable of effectively correcting a coma aberration. On the other hand, if a circular divided area is set at a size capable of correcting a coma aberration, it would be impossible for such a size to ensure an appropriate converging function for correcting aspherical aberration. As a result, there has been a problem that once one kind of aberration correction is to be ensured, the performance of the other kind of aberration correction will become deteriorated.

Moreover, it is also considerable to form divided areas necessary for a plurality of aberration corrections by forming finely divided electrode patterns on at least one transparent electrode side and then combining together these fine electrode patterns. This, however, makes electrode structure complex, rendering it difficult to control some portions where mutual interference occur due to corrections of different aberrations.

The present invention is to deal with the above-discussed problem and makes this as one of its tasks. Namely, the present invention is to provide an improved aberration correction device formed by inserting an electro-optic panel such as a liquid crystal panel in an image-formation optical system to correct aberrations in the image-formation optical system. Such an improved correction device is capable of correcting three or more kinds of aberrations using only one electro-optic panel, forming, on a pair of transparent electrodes of the electro-optic panel, divided areas divided into electrode patterns suitable for correcting various aberrations, simplifying as much as possible a structure of the transparent electrodes consisting of the divided areas, thereby simplifying a control of voltage applied to the divided areas.

Means for Solving the Problem

In order to achieve the foregoing object, an aberration correction device, an aberration correction method and an optical pickup according to the present invention have at least the following features recited in the following independent claims.

[Claim 1] There is provided an aberration correction device in which an electro-optic panel is inserted into an image-formation optical system to perform aberration correction in the image-formation optical system. In particular, the electro-optic panel comprises a pair of transparent electrodes which are formed by virtue of divided areas divided into electrode patterns capable of correcting several kinds of aberrations. Furthermore, part of the divided areas concerning one kind of aberration correction are formed in one of the transparent electrodes, and the rest of the divided areas concerning the one kind of aberration correction are formed in the other of the transparent electrodes.

[Claim 4] There is provided another aberration correction device formed by inserting an electro-optic panel into an image-formation optical system of an optical pickup to correct aberrations in the image-formation optical system, the optical pickup being a device in which a light beam emitted from a light source is converged on to a recording surface of an optical information recording medium and a reflection light from the recording surface is formed into an image on a detection surface of a detector. In particular, the electro-optic panel comprises a pair of transparent electrodes which are formed by virtue of divided areas divided into electrode patterns capable of correcting several kinds of aberrations. Furthermore, part of the divided areas concerning coma aberration correction and divided areas concerning astigmatism correction are formed in one of the transparent electrodes, while the rest of the divided areas concerning coma aberration correction and divided areas concerning spherical aberration correction are formed in the other of the transparent electrodes.

[Claim 5] There is provided an aberration correction method in which an electro-optic panel is inserted into an image-formation optical system of an optical pickup to correct aberrations in the image-formation optical system, the optical pickup being a device in which a light beam emitted from a light source is converged onto a recording surface of an optical information recording medium and a reflection light from the recording surface is formed into an image on a detection surface of a detector. In particular, the electro-optic panel comprises a pair of transparent electrodes which are formed by virtue of divided areas divided into electrode patterns capable of correcting several kinds of aberrations. Furthermore, at least at a time of correcting coma aberration, one voltage is applied to part of divided areas concerning coma aberration correction and formed in one of the pair of the transparent electrodes, while another voltage is applied to the rest of the divided areas concerning coma aberration correction and formed in the other of the transparent electrodes.

[Claim 6] There is provided an optical pickup having an image-formation optical system in which a light beam emitted from a light source is converged on to a recording surface of an optical information recording medium and a reflection light from the recording surface is formed into an image on a detection surface of a detector. In particular, an electro-optic panel for correcting aberrations in the image-formation optical system is inserted into an image-formation optical system. Furthermore, the electro-optic panel comprises a pair of transparent electrodes which are formed by virtue of divided areas divided into electrode patterns capable of correcting several kinds of aberrations, part of the divided areas concerning coma aberration correction and divided areas concerning astigmatism correction are formed in one of the transparent electrodes, while the rest of the divided areas concerning coma aberration correction and divided areas concerning spherical aberration correction are formed in the other of the transparent electrodes.

BEST MODE OF CARRYING OUT THE INVENTION

Next, description will be given to explain embodiments of the present invention with reference to the accompanying drawings. However, since the aberration correction device and the aberration correction method according to the embodiments of the present invention are suitable to be used with an optical pickup, the following description will be based on examples of their applications to an optical pickup. On the other hand, the aberration correction device and the aberration correction method according to the embodiments of the present invention are by no means to be limited to these examples. Moreover, although the following description will be based on a liquid crystal panel which serves as an example of an electro-optic panel of an aberration correction device, the electro-optic panel according to the present invention should not be limited to liquid crystal panel, provided that the electro-optic panel is comprised of a pair of transparent electrodes, capable of effecting an adjustment in phase difference of a transmitting light beam by virtue of a voltage applied to transparent electrodes.

Figure 1:
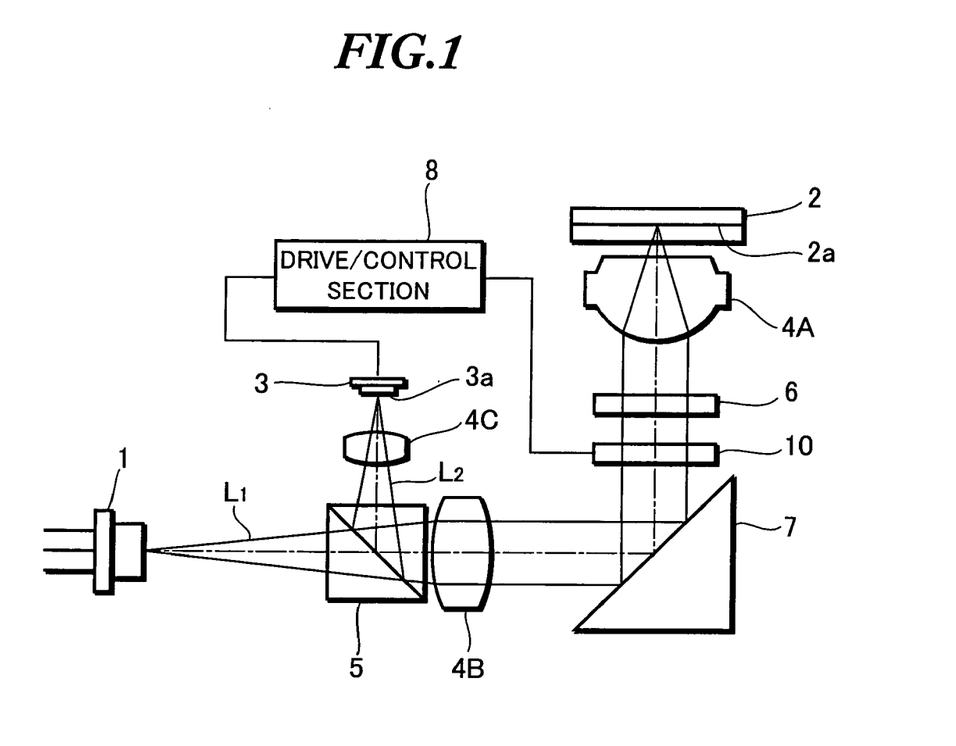
FIG. 1 is an explanatory view showing an example of a structure of an optical pickup having an aberration correction device formed according to one embodiment of the present invention.

FIG. 1 is an explanatory view showing an example of a structure of an optical pickup having an aberration correction device formed according to one embodiment of the present invention. As shown, the optical pickup has an image-formation optical system (including an object lens 4A, a collimator lens 4B, converging lens 4C) which converges a light beam $L_1$ emitted from a light source 1 such as red color (wavelength: 650 nm) LD (Laser Diode) on to a recording surface 2a of an optical information recording medium 2 such as an optical disc, thereby forming a reflection light $L_2$ from the recording surface 2a into an image on a detection surface 3a of a detector 3. The optical pickup further comprises a polarization beam splitter 5 for dividing the emitted light beam $L_1$ and the reflection light $L_2$, and ¼λ wave length plate 6. Besides, if necessary, the optical pickup has an upright prism 7 for effecting an optical-path polarization.

Here, the linearly polarized light beam $L_1$ transmitting through the polarization beam splitter 5 passes through the ¼λ wave length plate 6 intersected with a polarized wave surface of the linearly polarized light at an angle of 45 degrees, thereby forming a circularly polarized light which is converged by the objective lens 4A and reflected by the recording surface 2a, thus forming a reflection light $L_2$ which again passes through the ¼λ wavelength plate 6 to form a linearly polarized light which arrives at the polarization beam splitter 5. At this time, since the polarization axis of the reflection light $L_2$ becomes 90 degrees with respect to the polarization axis of the light beam $L_1$, the reflection light $L_2$ is reflected by the polarization beam splitter 5 and travels towards the detector 3.

The liquid crystal panel (electro-optic panel) 10 which performs aberration correction in the image-formation optical system is inserted into the image-formation optical system of the optical pickup. Further, there is provided a driving/control unit 8 for driving and controlling the liquid crystal panel 10. In this way, it is possible to control a voltage applied to the liquid crystal panel 10 in response to an output from the detector 3 (or an output from a tilt sensor which detects a tilt of an optical information recording medium).

Figure 2:
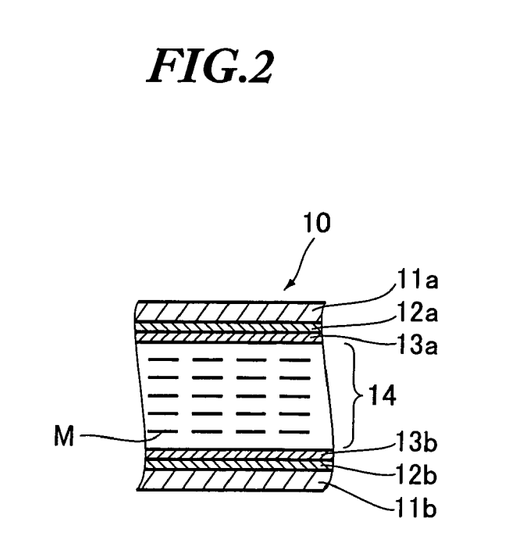
FIG. 2 is an explanatory view showing a structure of a liquid crystal panel (electro-optic panel) according to an embodiment of the present invention.

FIG. 2 is an explanatory view showing a structure of a liquid crystal panel 100 according to an embodiment of the present invention. As shown, the liquid crystal panel 10 comprises at least a pair of transparent electrodes 12a, 12b. In more detail, a pair of transparent electrodes 12a, 12b are formed on mutually facing surfaces of a pair of transparent substrates 11a, 11b. Further, orientation films 13a, 13b for providing a predetermined molecular orientation to the liquid crystal molecules M are formed on the mutually facing surfaces, followed by sealing a liquid crystal layer 14 having double refractions such as nematic liquid crystal between the orientation films 13a, 13b.

The aberrations in the image-formation optical system of such an optical pickup, as described above, are three kinds of aberrations including a coma aberration caused due to a tilt or the like of an optical information recording medium 2, a spherical aberration caused due to a thickness error or the like of the optical information recording medium 2, and an astigmatism occurred due to distortion of optical parts of the optical pickup.

Figure 3:
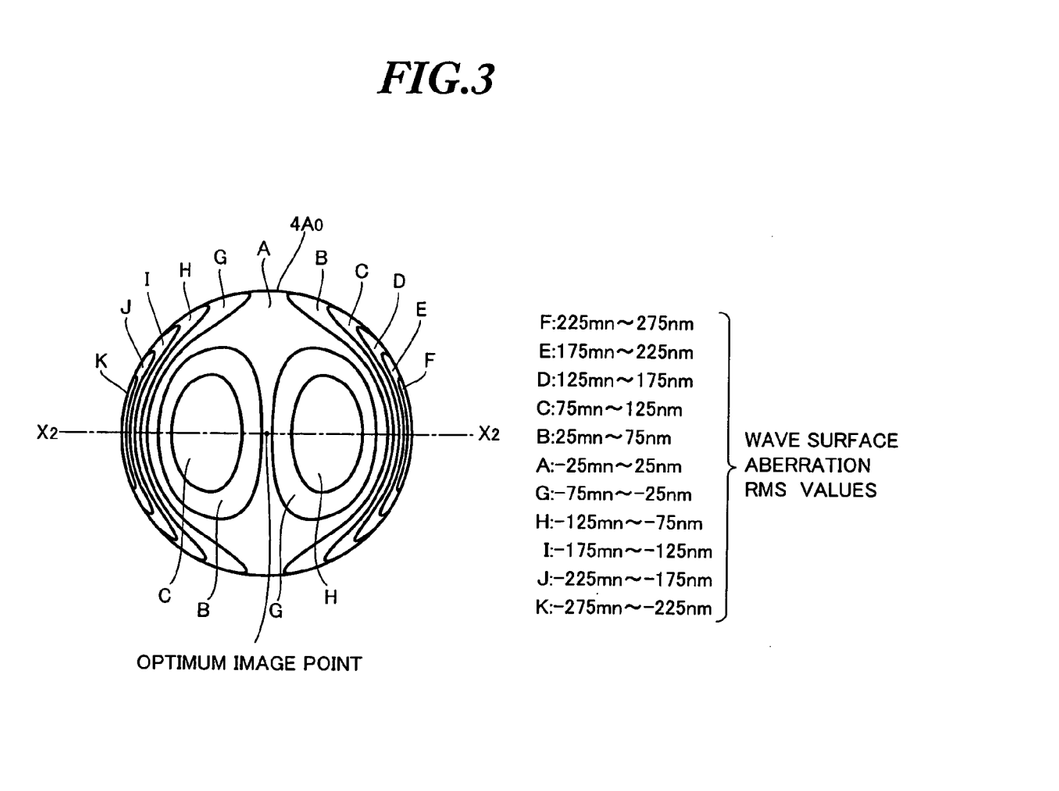
FIG. 3 is an explanatory view showing a distribution of coma aberration.

FIG. 3 shows a distribution of coma aberration. As shown, the distribution of coma aberration is represented by values on a pupil surface of the objective lens 4. An aberration distribution at an optimum image point of a converged spot of the light beam $L_1$ when the optical information recording medium 2 is tilted +10° is shown in a range of an open pupil $4A_0$ of the objective lens 4A (maximum area of the light beam $L_1$) (showing board lines of various areas A-K in a range of 50 nm with an area A having an aberration value of −25 nm to +25 nm serving as a center). Here, $X_2$-$X_2$ is an axis corresponding to a direction in which the optical information recording medium 2 tilts.

Paying attention to the distribution of such a coma aberration, an electrode pattern formed in the transparent electrode 12a (12b) of the liquid crystal panel 10 can form divided areas consisting of shapes along the aberration distribution shown in FIG. 3. Further, it is possible to provide a phase difference to a light beam to eliminate an aberration occurred in each divided area by virtue of a voltage applied to the divided area.

Figure 4:
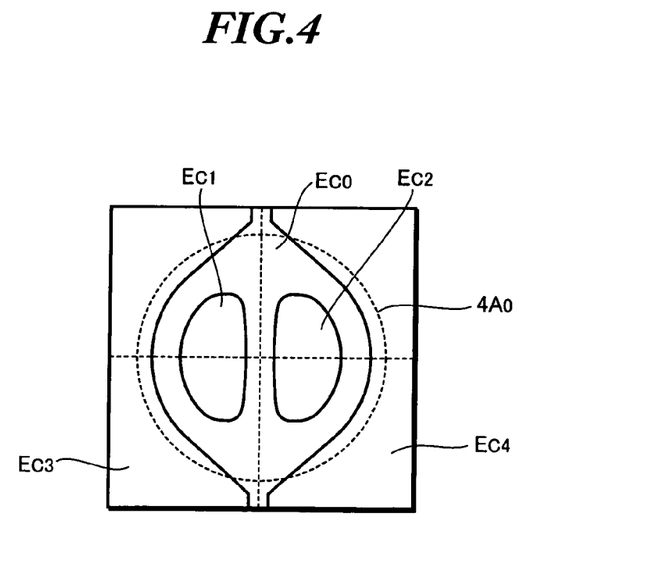
FIG. 4 is an explanatory view showing an electrode pattern concerning correction of coma aberration.

FIG. 4 shows an electrode pattern. As shown, an electrode pattern suitable for correcting coma aberration consists of five divided areas $E_{C0}$-$E_{C4}$ ($4A_0$ is an open pupil of an objective lens) Here, a divided area $E_{C0}$ is an area whose aberration value is 0, divided areas $E_{C0}$ and $E_{C4}$ are areas corresponding to an aberration indicating a large absolute value on the positive (+) side, divided areas $E_{C2}$ and $E_{C3}$ are areas corresponding to an aberration indicating a large absolute value on the minus (−) side. In this way, if a voltage having a reversed polarity is applied to the divided areas $E_{C1}$, $E_{C4}$ and divided areas $E_{C2}$, $E_{C3}$, and if a phase difference is provided to the light beam to eliminate aberration, it is possible to correct a coma aberration.

FIGS. 5(a)-5(c) shows an astigmatism distribution in the pupil surface of the objective lens 4A. FIG. 5(a) shows an astigmatism distribution surrounding an optical axis, with dark portions representing areas having large astigmatism. FIGS. 5(b) and 5(c) show Y1a-Y1b section and X1a-X1b section in FIG. 5(a). The astigmatism distribution in the pupil surface of the objective lens 4A is formed in a manner such that an aberration amount is larger closer to edge with X1a-X1b axis and Y1a-Y1b axis serving as objects, and that an aberration amount is small at an angle of 45° between X1a-X1b axis and Y1a-Y1b axis. In fact, such an astigmatism distribution is not a characteristic of each image-formation optical system, while an optical system involving astigmatism has the same distribution pattern. However, its direction will be different depending on different optical system, with the X1a-X1b axis and Y1a-Y1b axis of FIG. 5(a) rotating by virtue of the optical system. Further, an aberration amount and its direction of the astigmatism will also have different values depending on different optical system.

Figure 5:
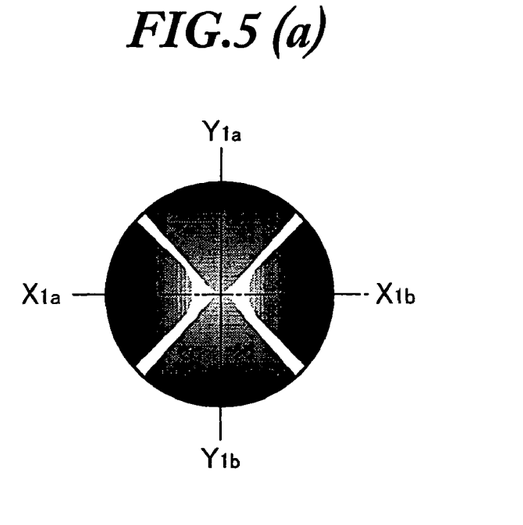
FIG. 5 is an explanatory view showing a distribution of astigmatism.

Paying attention to such an astigmatism distribution, an electrode pattern formed in transparent electrode 12a (12b) of the liquid crystal panel 10 can form the divided areas consisting of shapes along the aberration distribution shown in FIG. 5. Further, it is possible to provide a phase difference to a light beam to eliminate an aberration occurred in each divided area by virtue of a voltage applied to the divided area.

Figure 6:
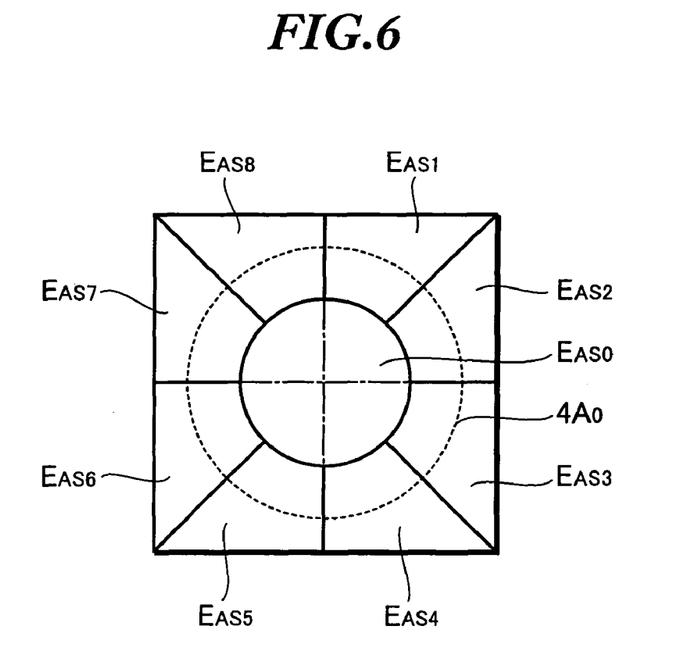
FIG. 6 is an explanatory view showing an electrode pattern concerning correction of astigmatism.

FIG. 6 shows an electrode pattern. As shown, an electrode pattern suitable for correcting astigmatism has for example nine divided areas $E_{AS0}$-$E_{AS8}$ with respect to an open pupil $4A_0$ of the objective lens 4A. One divided area $E_{AS0}$ is a circular pattern corresponding to a central portion of the open pupil $4A_0$, while other divided areas $E_{AS1}$-$E_{AS8}$ are patterns radially divided in the perimeter portion and symmetrically arranged in a manner such that they are separated from one another at substantially the same interval and the same angle from the center of the open pupil $4A_0$. Then, the divided areas $E_{AS1}$, $E_{AS5}$, $E_{AS2}$ and $E_{AS6}$, $E_{AS3}$ and $E_{AS7}$, $E_{AS4}$, $E_{AS8}$ are arranged to face one another and positioned centrally symmetrically, while voltages having the same polarity are selectively applied to these areas, thereby making it possible to perform an aberration correction corresponding to a specific direction of an astigmatism.

Figure 7:
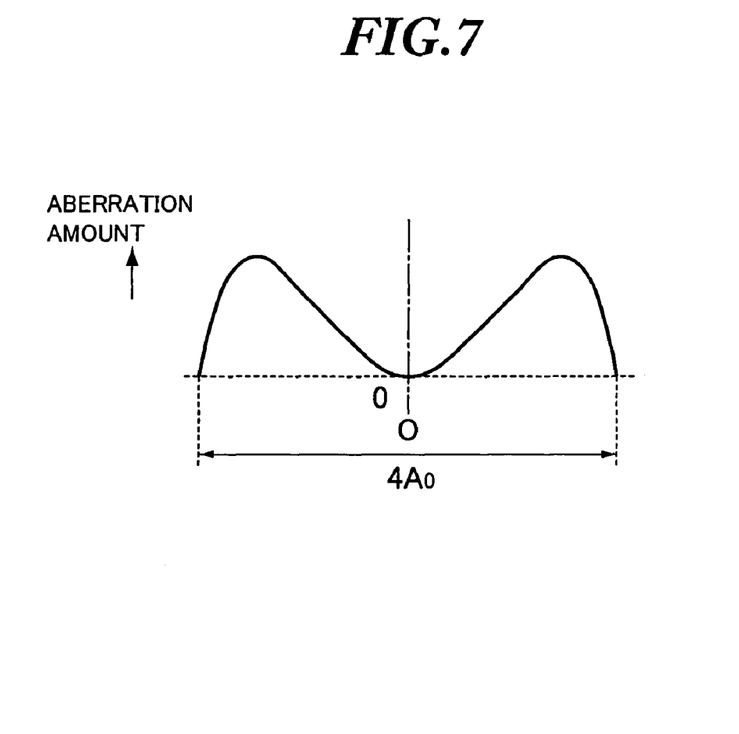
FIG. 7 is an explanatory view showing a distribution of spherical aberration.

FIG. 7 shows a distribution of a spherical aberration in the pupil surface of the objective lens 4A. Such a spherical aberration shows a symmetrical distribution with respect to the center O of the open pupil $4A_0$, with an aberration amount being zero at the center O and along the edges of the open pupil $4A_0$, and becoming large in an annular area slightly separated from the center O.

Figure 8:
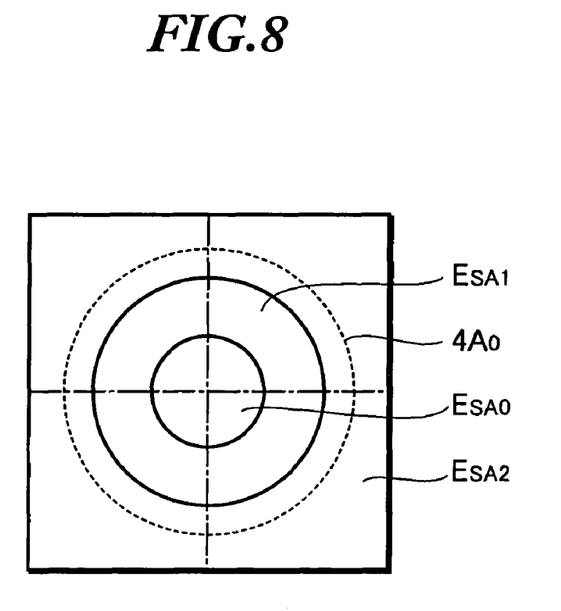
FIG. 8 is an explanatory view showing an electrode pattern concerning correction of spherical aberration.

FIG. 8 shows an electrode pattern which enables correction of the spherical aberration. As shown, such electrode pattern forms divided areas consisting of shapes corresponding to an aberration distribution shown in FIG. 7. Further, it is possible to provide a phase difference to a light beam to eliminate an aberration occurred in each divided area by virtue of a voltage applied to the divided area. Namely, the divided areas at this time include a circular divided area $E_{SA0}$ corresponding to central portion of the open pupil $4A_0$ of the objective lens 4A, an annular divided perimeter area $E_{SA1}$, and a divided area $E_{SA2}$ in the perimeter portion.

Using the liquid crystal panel 10 of the aberration correction device according to the present invention, it is possible to effectively correct three kinds of aberrations (coma aberration, astigmatism, spherical aberration) by virtue of one liquid crystal panel 10. Therefore, it is possible to form part of the divided areas concerning one kind of aberration correction in one of the transparent electrodes 12a and 12b, and the rest of the divided areas concerning this one kind of aberration correction in the other of the transparent electrodes 12a and 12b.

FIGS. 9(a) and 9(b) show in more detail electrode patterns of the transparent electrodes 12a, 12b. Here, FIG. 9(a) shows an electrode pattern of one of the transparent electrodes 12a, 12b, while FIG. 9(b) shows an electrode pattern of the other of the transparent electrodes 12a, 12b.

Figure 9:
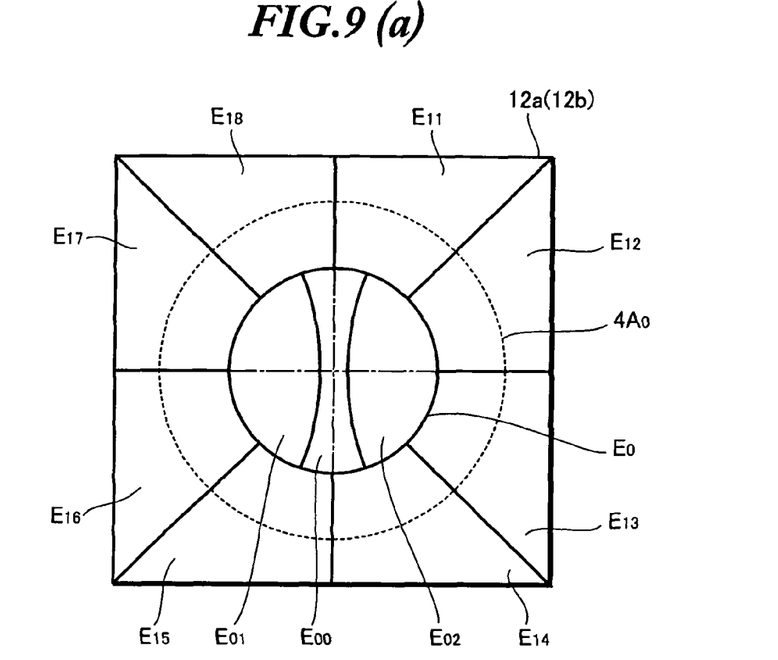
FIG. 9 is an explanatory view showing electrode pattern of an aberration correction device according to an embodiment of the present invention.

In the electrode pattern shown in FIG. 9 (a) there are formed part of divided areas concerning coma aberration correction and divided areas concerning astigmatism correction. Namely, a generally circular pattern $E_0$ is formed in the center of the open pupil $4A_0$ of the objective lens 4. This is then divided into three portions $E_{00}$, $E_{01}$, and $E_{02}$ to form part of divided areas concerning coma aberration correction, while edge portion on the outside of the generally circular pattern $E_0$ is radially divided to form divided areas $E_{11}$-$E_{18}$ concerning astigmatism correction.

At this time, the generally circular pattern $E_0$ and the divided areas $E_{00}$, $E_{01}$, and $E_{02}$ are set to ensure a pattern effective in aberration correction, in accordance with an aberration distribution of coma aberration shown in FIG. 3. Then, the perimeter portion is divided at substantially an equal angle from the center of the open pupil $4A_0$ so as to set symmetrically divided areas $E_{11}$-$E_{18}$, with the divided areas $E_{11}$ and $E_{15}$, $E_{12}$ and $E_{16}$, $E_{13}$ and $E_{17}$, $E_{14}$ and $E_{18}$ respectively facing each other and arranged in a centrally symmetric array.

Moreover, in an electrode pattern shown in FIG. 9(b) there are formed divided areas concerning coma aberration correction and divided areas concerning spherical aberration correction. Namely, the divided areas concerning spherical aberration correction include a circularly patterned divided area $E_{20}$ formed in the center of the open pupil $4A_0$ of the objective lens 4, and an annular concentrically patterned divided area $E_{21}$. Further, the rest of divided areas ($E_{31}$, $E_{32}$, $E_{30a}$, $E_{30b}$) concerning coma aberration correction are formed on the outside of the annular area.

At this time, the circularly patterned divided area $E_{20}$ and the annular concentrically patterned divided area $E_{21}$ are set to be suitable for correcting spherical aberration, while the perimeter area is set as the rest of the divided areas ($E_{31}$, $E_{32}$, $E_{30a}$, $E_{30b}$) concerning coma aberration correction.

By virtue of the electrode patterns with respect to the foregoing transparent electrodes 12a and 12b, the divided areas $E_{00}$, $E_{01}$, $E_{02}$, $E_{31}$, $E_{32}$, $E_{30a}$, $E_{30b}$ concerning coma aberration correction can be divided into two groups, with the divided areas $E_{00}$, $E_{01}$, $E_{02}$ being formed on one of the transparent electrodes 12a and 12b, and the divided areas $E_{31}$, $E_{32}$, $E_{30a}$, $E_{30b}$ being formed on the other of the transparent electrodes 12a and 12b. In this way, all divided areas necessary for correcting three kinds of aberrations can be formed into patterns capable of providing the same correction effect as the divided areas when individually correcting an aberration, without causing any mutual interference among these divided areas.

Figure 10:
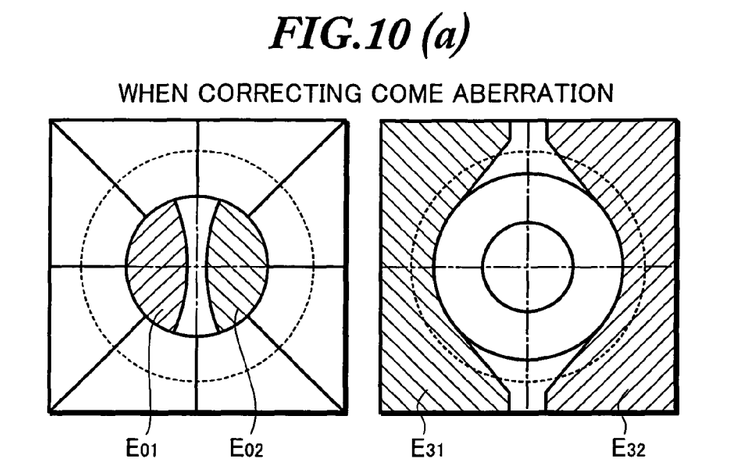
FIG. 10 is an explanatory view showing voltage applying pattern of an aberration correction device according to an embodiment of the present invention.

FIG. 10 shows several voltage patterns applied to the liquid crystal panel 10 according to the above-described embodiment. FIG. 10(a) shows a voltage pattern applied when correcting a coma aberration, FIG. 10(b) shows a voltage pattern applied when correcting a spherical aberration, FIG. 10(c) shows a voltage pattern applied when correcting an astigmatism.

As shown in FIG. 10(a), voltages are applied to the foregoing divided areas $E_{01}$, $E_{02}$, $E_{31}$, $E_{32}$ when correcting coma aberration, with the areas $E_{01}$ and $E_{32}$ receiving voltages of the same polarity and the areas $E_{02}$, $E_{31}$ receiving voltages of the opposite polarity. As shown in FIG. 10(b), when correcting a spherical aberration, a voltage is applied to the foregoing divided area $E_{21}$. As shown in FIG. 10(c), when correcting astigmatism, voltages are selectively applied to the divided areas $E_{12}$, $E_{14}$, $E_{15}$, and $E_{18}$.

Figure 11:
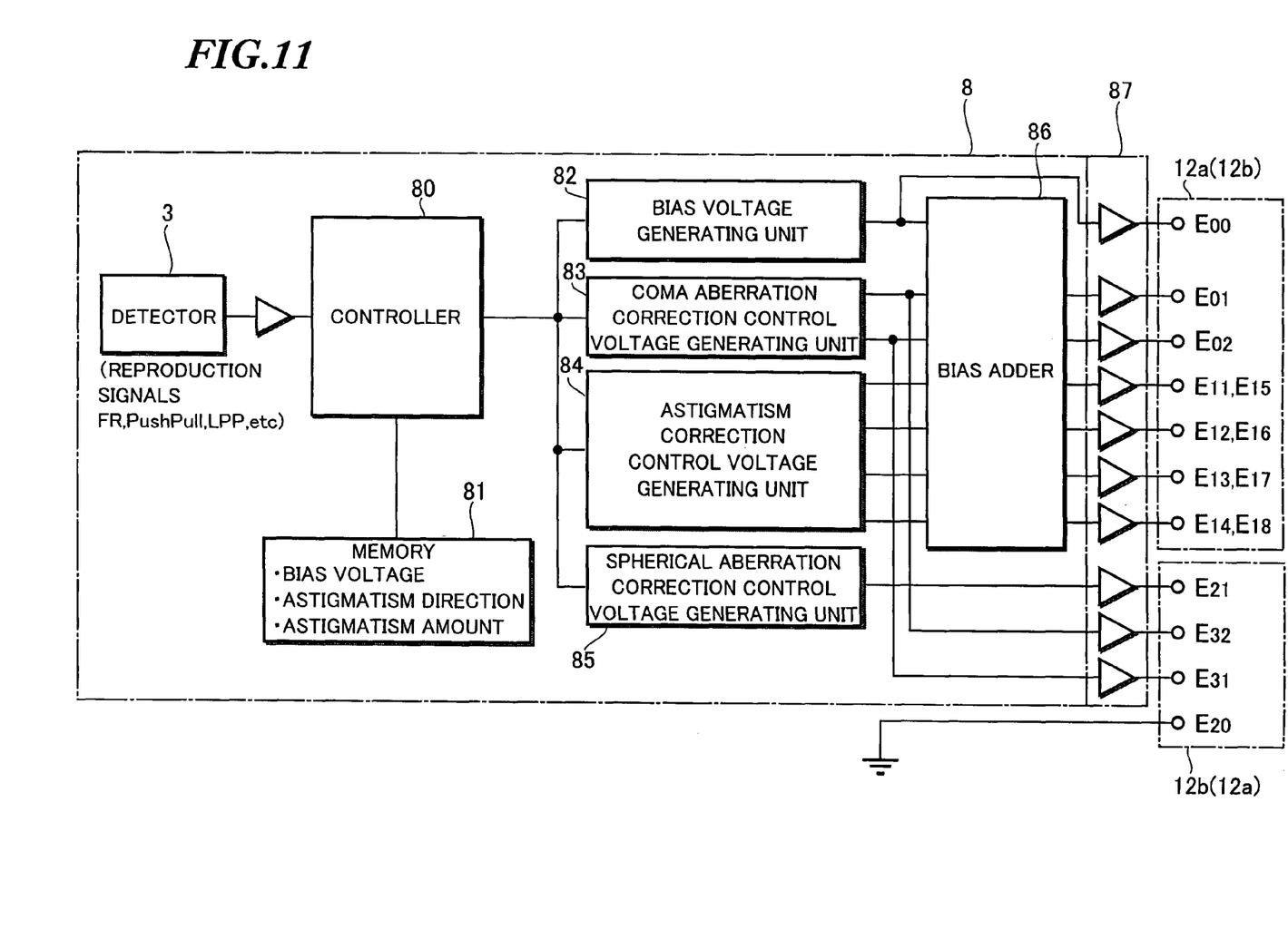
FIG. 11 is a block diagram showing an example of an internal structure of a drive/control unit for driving and controlling a liquid crystal panel (electro-optic panel) according to an embodiment of the present invention.

FIG. 11 shows an example of a structure of the drive/control section 8 which drives/controls the foregoing liquid crystal panel 10. As shown, the drive/control section 8 comprises a controller 80 consisting of CPU which receives reproduction signals (RF, PushPull, LPP, or the like) from a detector 3; a memory 81 for storing a bias voltage, an astigmatism direction, an astigmatism amount or the like; a bias voltage generating unit 82 for outputting a bias voltage in accordance with an output of the controller 80; a coma aberration correction control voltage generating unit 83 which outputs a coma aberration correction control voltage in accordance with an output from the controller 80; an astigmatism correction control voltage generating unit 84 which outputs an astigmatism correction control voltage in accordance with an output from the controller 80; a spherical aberration correction control voltage generating unit 85 which outputs a spherical aberration correction control voltage in accordance with an output from the controller 80; a bias addition unit 86 which adds a bias voltage outputted from the bias voltage generating unit 82 to an output from the coma aberration correction control voltage generating unit 83 as well as to an output from the astigmatism correction control voltage generating unit 84; and a liquid crystal driving unit 87.

The outputs from the coma aberration correction control voltage generating unit 83 and the astigmatism correction control voltage generating unit 84 in both of which bias voltages have been added, are supplied through the liquid crystal driving unit 87 to the divided areas ($E_{00}$, $E_{01}$, $E_{02}$, $E_{11}$, $E_{15}$ and $E_{12}$, $E_{16}$ and $E_{13}$, and $E_{17}$, $E_{14}$ and $E_{18}$) formed in one of the pair of transparent electrodes 12a and 12b. On the other hand, the outputs from the coma aberration correction control voltage generating unit 83 and the spherical aberration correction control voltage generating unit 85 in both of which bias voltages have not been added, are supplied to the divided areas ($E_{21}$, $E_{32}$, $E_{31}$, $E_{20}$) formed in the other of the pair of transparent electrodes 12a and 12b. Moreover, the divided area $E_{20}$ is in an earthed state.

Next, description will be given to an operation of the drive/control section 8.

Figure 12:
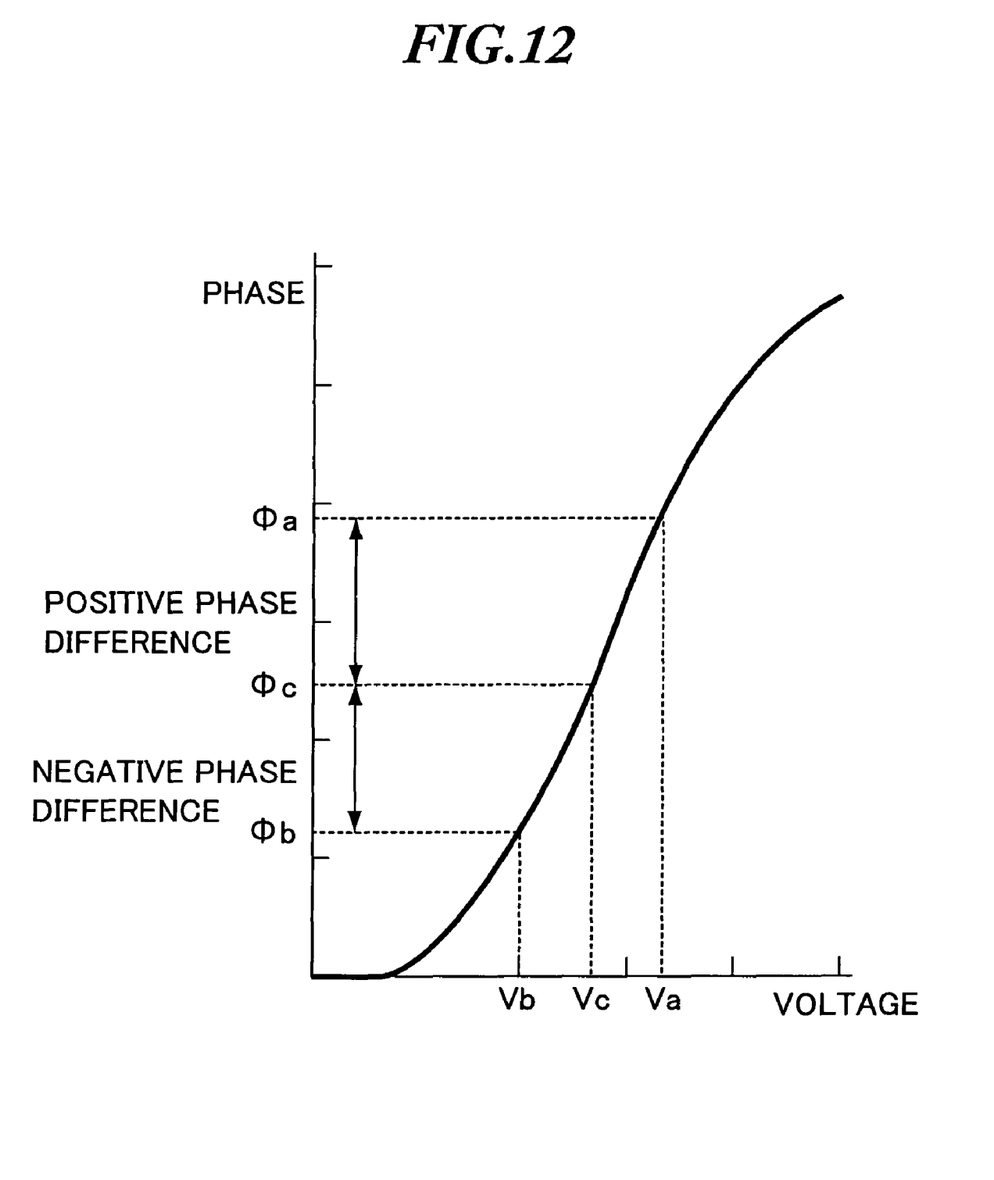
FIG. 12 is an explanatory graph explaining a voltage-phase characteristic of a liquid crystal panel.

At first, regarding an addition of bias voltage, it can be understood from FIG. 12 that a voltage-phase difference characteristic of the liquid crystal panel 10 is limited to an operation range (dynamic range) which can be considered as a linear approximation. Therefore, with regard to coma aberration correction and astigmatism correction which require an amount control or a bipolarity (+, −) control, a bias voltage Vc is set in the vicinity of the center of the dynamic range and will be stored in the memory 81. Then, if a phase-difference at a time of applying a bias voltage Vc is used as a reference phase difference $\phi c$, it is possible to control a positive phase difference ($\phi a - \phi c$) by virtue of a control voltage Va which is higher than the bias voltage Vc, and also possible to control a negative phase difference ($\phi b - \phi c$) by virtue of a control voltage Vb which is lower than the bias voltage Vc.

Regarding coma aberration correction, a coma aberration at this time is caused due to a tilt or warp of an optical information recording medium (optical disc) 2 or the like. Such coma aberration correction is performed in accordance with a magnitude of reproduction signal, a jitter, an error rate, or the like when playing back an optical information recording medium 2 using an optical pickup. In more detail, when the controller 80 sets a coma aberration correction control voltage in accordance with a signal from the detector 3, it will set a coma aberration correction control voltage in a manner such that the amplitude of a tracking error signal or a wobble signal reproduced by applying a focus servo to the optical information recording medium 2 will become maximum.

A control voltage formed by adding the foregoing bias voltage Vc to the coma aberration correction control voltage is applied to the divided areas $E_{01}$ and $E_{02}$ formed in one of the transparent electrodes 12a and 12b. On the other hand, since the bias voltage Vc is applied to one of the transparent electrodes 12a and 12b, a coma aberration correction control voltage not containing the bias voltage Vc is applied to the divided areas $E_{31}$ and $E_{32}$ formed in the other of the transparent electrodes 12a and 12b.

Next, regarding an astigmatism correction, such astigmatism is mainly an aberration caused due to an insufficient precision in parts or an inadequate assembling precision of an optical pickup. In assembling an optical pickup, such a correction is performed by observing a beam spot converged by the objective lens 4A. Once there is astigmatism, a beam spot which should be converged into a circular shape will become an ellipse. Accordingly, this is observed, and an ellipse direction as well as a deformation extent are found, thereby measuring an astigmatism direction and an astigmatism magnitude which are then stored in the memory 81. In fact, with respect to the beam spot deformed into an ellipse, voltages are selectively applied to the divided areas $E_{11}$-$E_{18}$ and an adjustment is performed in a manner such that the beam spot becomes circular, with an adjustment value being stored in the memory.

Then, an astigmatism correction at the time of driving an optical pickup can be carried out as follows. Namely, the controller 80 reads out the above-mentioned adjustment value from the memory 81 and then supplies the value to the astigmatism correction control voltage generating unit 84, thereby generating a correction control voltage. Subsequently, another control voltage formed by adding the foregoing bias voltage Vc in the correction control voltage is selectively applied to the divided areas $E_{11}$-$E_{18}$ (one or more pairs of $E_{11}$ and $E_{15}$, $E_{12}$ and $E_{16}$, $E_{13}$ and $E_{17}$, $E_{14}$ and $E_{18}$) formed in one of the transparent electrodes 12a and 12b.

Next, regarding spherical aberration correction, such spherical aberration is caused due to a thickness error of a covering layer of the optical information recording medium 2. The spherical aberration correction is carried out in accordance with a magnitude of a reproduction signal, a jitter, an error rate or the like when playing back an optical information recording medium 2 using an optical pickup. In more detail, when the controller 80 sets a spherical aberration correction control voltage in accordance with a signal from the detector 3, it will set a spherical aberration correction control voltage in a manner such that the amplitude of a tracking error signal or a wobble signal reproduced by applying a focus servo to the optical information recording medium 2 will become maximum. Then, the spherical aberration correction control voltage (not containing the bias voltage Vc) is applied to the divided area $E_{21}$ formed in the other of the transparent electrodes 12a and 12b. In this way, since such a voltage application provides a phase difference to a light beam passing through the divided area $E_{21}$, a spherical aberration can thus be corrected.

Figure 13:
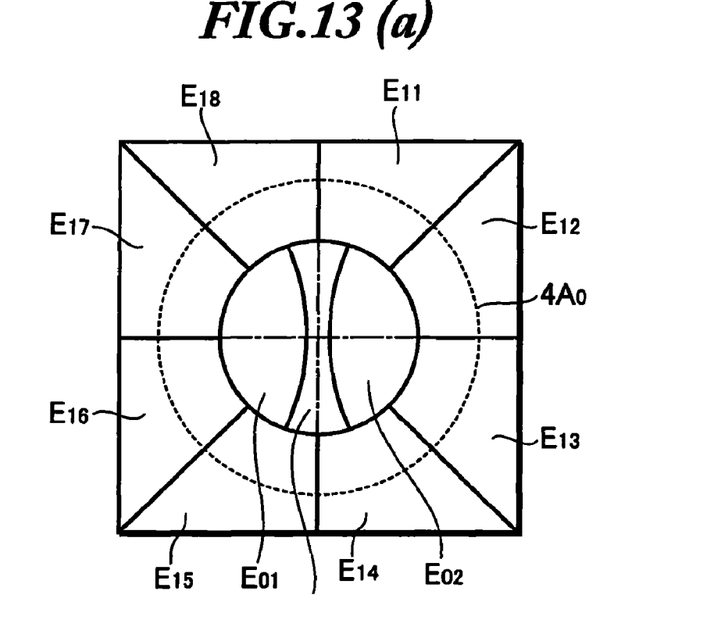
FIG. 13 shows comparative examples explaining an aberration correction performance of the aberration correction device according to an embodiment of the present invention.
Figure 14:
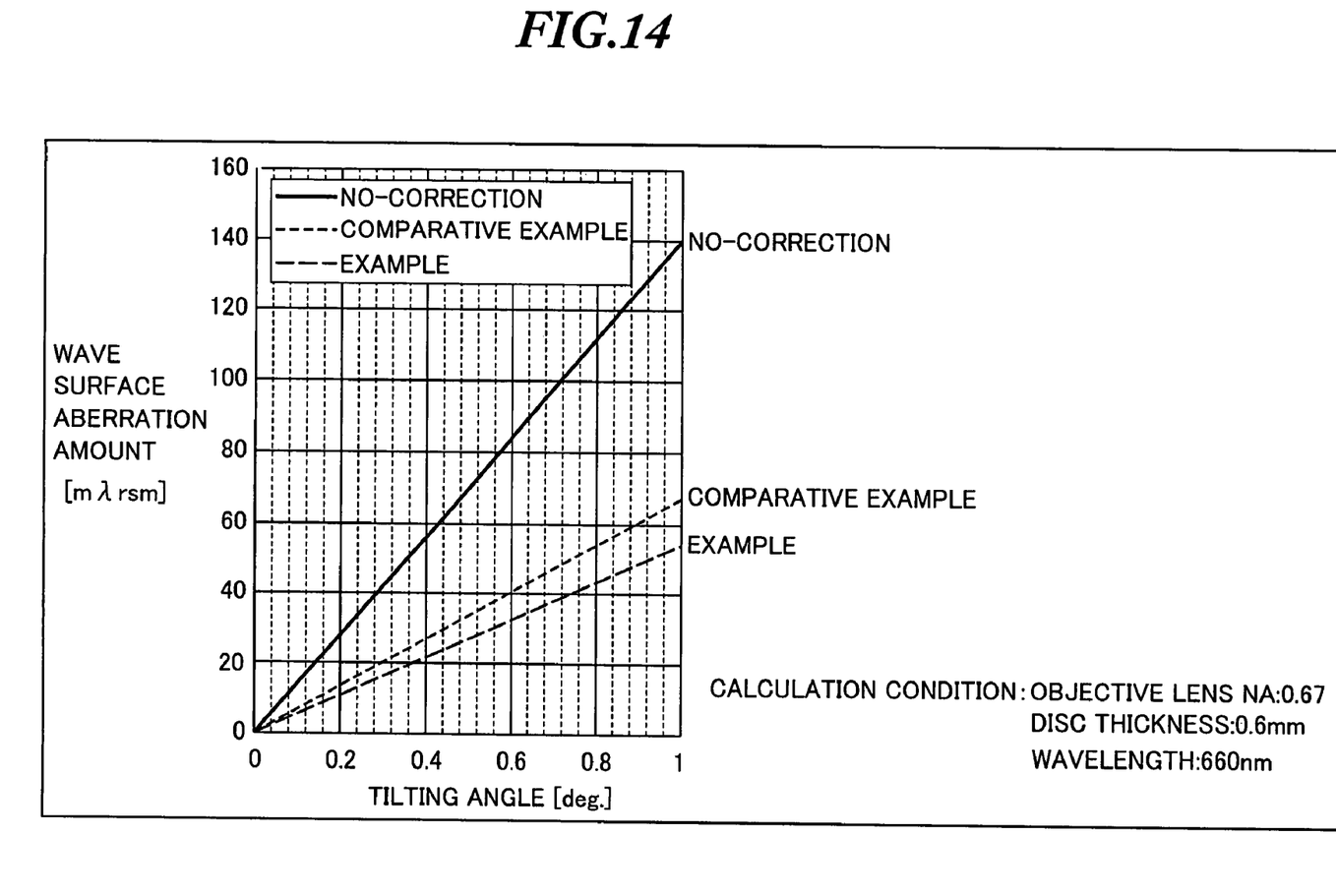
FIG. 14 is a graph explaining an aberration correction performance of the aberration correction device according to an embodiment of the present invention.

Next, description will be given to explain an aberration correction performance of an aberration correction device formed according to an embodiment of the present invention. FIG. 13 shows comparative examples explaining the aberration correction performance of aberration correction device. In the comparative examples, electrode patterns concerning coma aberration correction are set only in the divided areas $E_{01}$ and $E_{02}$, and thus formed only on one of the transparent electrodes. FIG. 14 is a graph showing amounts of wave surface aberrations (coma aberrations) with respect to a tilt angle (a tilt angle in the radial direction) of an optical information recording medium 2 (optical disc), in the above-described embodiment (example), comparative example, and no-correction case (amounts of wave surface aberrations are calculated under the conditions of: NA of objective lens: 0.67; thickness of disc: 0.6 mm; wave length of light source: 660 nm).

As clearly understood in FIG. 14, the aberration correction device of the present invention makes it possible to reduce coma aberration by 40% as compared with no-correction case, and to ensure an aberration correction performance higher than the comparative example. Further, as to other kinds of aberrations, the present invention makes it possible to reduce spherical aberration by 50% and astigmatism by 60%. Namely, the aberration correction device of the present invention makes it possible to obtain an effect equivalent to a case in which the respective aberration correction electrodes are independently designed.

Finally, the aberration correction device, the aberration correction method, and the optical pickup using the aberration correction device or the method can be concluded as having the following features.

Firstly, the aberration correction device formed by inserting an electro-optic panel (liquid crystal panel 10) in an image-formation optical system to perform aberration corrections in the image-formation optical system, is characterized in that: the image-formation optical system has a pair of transparent electrodes 12a and 12b which are formed by virtue of divided areas divided into electrode patterns capable of correcting several kinds of aberrations; part of the divided areas for correcting one kind of aberration are formed in one of the transparent electrodes 12a and 12b, while the rest of the divided areas for correcting the foregoing one kind of aberration are formed in the other of the transparent electrodes 12a and 12b.

In this way, the divided areas for correcting one kind of aberration are classified into two patterns and formed in different transparent electrodes 12a and 12b, thereby making it possible to avoid an interference of electrode patterns which would otherwise occur if the electrode patterns for correcting several kinds of aberrations are collected in only one of the transparent electrodes 12a and 12b. Therefore, even when correcting several kinds of aberrations using single one electro-optic panel, it is still possible to independently control the divided areas concerning various aberrations using a simple electrode pattern, thereby rendering it possible to perform an easy driving of the electro-optic panel and avoid a deterioration of an aberration correction performance.

Secondly, the aberration correction device is characterized in that part of divided areas ($E_{00}$, $E_{01}$, $E_{02}$) concerning coma aberration correction and the divided areas $E_{11}$-$E_{18}$ concerning astigmatism correction are formed in one of the transparent electrodes 12a and 12b, while the rest of divided areas ($E_{31}$, $E_{32}$) concerning coma aberration correction and the divided areas $E_{20}$ and $E_{21}$ concerning spherical aberration correction are formed in the other of the transparent electrodes 12a and 12b.

In this way, since part of the divided areas ($E_{00}$, $E_{01}$, $E_{02}$) concerning coma aberration correction and patterned in the center of the open pupil $4A_0$, and the divided areas $E_{11}$-$E_{18}$ concerning astigmatism correction and radially patterned in the vicinity of the open pupil $4A_0$ are all formed in one electrode 12a ($12_b$), it is possible to form these divided areas without any mutual interference. Further, since the divided areas $E_{20}$, $E_{21}$ concerning spherical aberration correction and patterned in the center of the open pupil $4A_0$ and the divided areas ($E_{31}$, $E_{32}$) concerning coma aberration correction and patterned in the vicinity of the open pupil $4A_0$ are also formed in one electrode 12a ($12_b$), it is similarly possible to form these divided areas without any mutual interference. Therefore, it is possible to independently form electrode patterns concerning corrections of coma aberration, astigmatism, and spherical aberration in single one electro-optic panel, and obtain an aberration correction effect equivalent to a case in which various aberration correction electrodes are independently designed.

In more detail, a generally circular pattern in the center is divided into three portions to form divided areas ($E_{00}$, $E_{01}$, $E_{02}$) concerning coma aberration correction in one of the transparent electrodes 12a and 12b, while an area on the outside of this generally circular pattern is divided radially to form divided areas $E_{11}$-$E_{18}$ concerning astigmatism correction. Meanwhile, the central circular pattern, and divided areas $E_{20}$ and $E_{21}$ consisting of an annular pattern concentric with the central circular pattern and concerning spherical aberration correction are formed in the other of the transparent electrodes 12a and 12b, while the rest of divided areas ($E_{31}$, $E_{32}$) concerning coma aberration correction are formed on the outside of the divided areas $E_{20}$ and $E_{21}$, thereby obtaining the above-described effects.

When the aberration correction device having the above-described features is used in the image-formation optical system of the optical pickup in which a light beam emitted from the light source 1 is converged on to the recording surface 2a of the optical information recording medium 2 and the reflection light from the recording surface 2a is formed into an image on the detection surface of the detector 3, it is possible to correct, using only one electro-optic panel, an aberration caused due to a tilt of the optical information recording medium 2, an aberration caused due to a thickness error of the optical information recording medium 2, and an aberration caused due to errors involved in manufacturing parts of the optical pickup. In this way, it is possible to produce an optical pickup capable of highly reliable information recording or reproducing, at a low cost and a reduced size.

Moreover, in the aberration correction method using the above-described aberration correction device, at least when correcting a coma aberration, voltages are applied to the divided areas ($E_{01}$, $E_{02}$) formed in one of the pair of the transparent electrodes 12a and 12b concerning coma aberration correction, while other voltages are applied to the divided areas ($E_{31}$, $E_{32}$) formed in the other of the pair of the transparent electrodes 12a and 12b concerning coma aberration correction, thereby making it possible to avoid a complex control, thus enabling a driving of the liquid crystal panel 10 in the same manner as a case in which coma aberration is corrected individually.

The invention claimed is:

1. An aberration correction device in which a liquid crystal panel is inserted into an image-formation optical system to perform aberration correction in the image-formation optical system,
wherein the liquid crystal panel comprises a pair of transparent electrodes which are formed by virtue of divided areas divided into electrode patterns capable of selectively correcting several kinds of aberrations including coma aberration, spherical aberration and astigmatism,
wherein part of the divided areas concerning coma aberration correction are formed in one of the transparent electrodes, and the rest of the divided areas concerning coma aberration correction are formed in the other of the transparent electrodes,
wherein the part of the divided areas concerning coma aberration correction and the divided areas concerning astigmatism correction are formed in one of the transparent electrodes, while the rest of the divided areas concerning coma aberration correction and the divided areas concerning spherical aberration correction are formed in the other of the transparent electrodes,
wherein a central and generally circular pattern is divided into three portions to form part of the divided areas concerning coma aberration correction in one of the transparent electrodes, and an area on the outside of said generally circular pattern is radially divided to form divided areas concerning astigmatism correction, while a central circular pattern and divided areas consisting of an annular pattern concentric with the central circular pattern concerning spherical aberration correction are formed in the other of the transparent electrodes, and the rest of the divided areas concerning coma aberration correction are formed on the outside of said divided areas concerning spherical aberration correction.

2. An aberration correction device formed by inserting a liquid crystal panel into an image-formation optical system of an optical pickup to correct aberrations in the image-formation optical system, said optical pickup being a device in which a light beam emitted from a light source is converged on to a recording surface of an optical information recording medium and a reflection light from the recording surface is formed into an image on a detection surface of a detector, wherein the liquid crystal panel comprises a pair of transparent electrodes which are formed by virtue of divided areas divided into electrode patterns capable of selectively correcting several kinds of aberrations including coma aberration, spherical aberration and astigmatism, wherein part of the divided areas concerning coma aberration correction and the divided areas concerning astigmatism correction are formed in one of the transparent electrodes, while the rest of the divided areas concerning coma aberration correction and divided areas concerning spherical aberration correction are formed in the other of the transparent electrodes, wherein a central and generally circular pattern is divided into three portions to form part of the divided areas concerning coma aberration correction in one of the transparent electrodes and an area on the outside of said generally circular pattern is radially divided to form divided areas concerning astigmatism correction, while a central circular pattern and divided areas consisting of an annular pattern concentric with the central circular pattern concerning spherical aberration correction are formed in the other of the transparent electrodes, and the rest of the divided areas concerning coma aberration correction are formed on the outside of said divided areas concerning spherical aberration correction.

3. An aberration correction method in which a liquid crystal panel is inserted into an image-formation optical system of an optical pickup to correct aberrations in the image-formation optical system, said optical pickup being a device in which a light beam emitted from a light source is converged on to a recording surface of an optical information recording medium and a reflection light from the recording surface is formed into an image on a detection surface of a detector, wherein the liquid crystal panel comprises a pair of transparent electrodes which are formed by virtue of divided areas divided into electrode patterns capable of selectively correcting several kinds of aberrations including coma aberration, spherical aberration and astigmatism, wherein at least at a time of correcting coma aberration, one voltage is applied to part of divided areas concerning coma aberration correction and formed in one of the pair of the transparent electrodes, while another voltage is applied to the rest of the divided areas concerning coma aberration correction and formed in the other of the transparent electrodes, wherein a central and generally circular pattern is divided into three portions to form part of the divided areas concerning coma aberration correction in one of the transparent electrodes and an area on the outside of said generally circular pattern is radially divided to form divided areas concerning astigmatism correction, while a central circular pattern and divided areas consisting of an annular pattern concentric with the central circular pattern concerning spherical aberration correction are formed in the other of the transparent electrodes, and the rest of the divided areas concerning coma aberration correction are formed on the outside of said divided areas concerning spherical aberration correction.

4. An optical pickup having an image-formation optical system in which a light beam emitted from a light source is converged on to a recording surface of an optical information recording medium and a reflection light from the recording surface is formed into an image on a detection surface of a detector, wherein a liquid crystal panel for correcting aberrations in the image-formation optical system is inserted into an image-formation optical system, wherein the liquid crystal panel comprises a pair of transparent electrodes which are formed by virtue of divided areas divided into electrode patterns capable of correcting several kinds of aberrations including coma aberration, spherical aberration and astigmatism, part of the divided areas concerning coma aberration correction and the divided areas concerning astigmatism correction are formed in one of the transparent electrodes, while the rest of the divided areas concerning coma aberration correction and the divided areas concerning spherical aberration correction are formed in the other of the transparent electrodes, wherein a central and generally circular pattern is divided into three portions to form part of the divided areas concerning coma aberration correction in one of the transparent electrodes, and an area on the outside of said generally circular pattern is radially divided to form divided areas concerning astigmatism correction while a central circular pattern and divided areas consisting of an annular pattern concentric with the central circular pattern concerning spherical aberration correction are formed in the other of the transparent electrodes and the rest of the divided areas concernin coma aberration correction are formed on the outside of said divided areas concerning spherical aberration correction.

* * * * *